US011108285B2

(12) United States Patent
Ikura

(10) Patent No.: US 11,108,285 B2
(45) Date of Patent: Aug. 31, 2021

(54) ROTARY ELECTRIC MACHINE STATOR AND MANUFACTURING METHOD THEREFOR

(71) Applicant: Mitsubishi Electric Corporation, Tokyo (JP)

(72) Inventor: Yutaka Ikura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 16/346,326

(22) PCT Filed: Nov. 11, 2016

(86) PCT No.: PCT/JP2016/083534
§ 371 (c)(1),
(2) Date: Apr. 30, 2019

(87) PCT Pub. No.: WO2018/087887
PCT Pub. Date: May 17, 2018

(65) Prior Publication Data
US 2019/0305614 A1    Oct. 3, 2019

(51) Int. Cl.
*H02K 1/18*      (2006.01)
*H02K 1/14*      (2006.01)
(Continued)

(52) U.S. Cl.
CPC .............. *H02K 1/185* (2013.01); *F16M 1/04* (2013.01); *H02K 1/146* (2013.01); *H02K 3/522* (2013.01);
(Continued)

(58) Field of Classification Search
CPC .......... F16M 1/04; H02K 11/21; H02K 15/02; H02K 1/146; H02K 1/185; H02K 2203/03; H02K 24/00; H02K 3/522; H02K 5/04
(Continued)

(56) References Cited

U.S. PATENT DOCUMENTS

2002/0175574 A1\* 11/2002 Okazaki ................. H02K 5/225
  310/68 B
2011/0080064 A1    4/2011 Kudose et al.
(Continued)

FOREIGN PATENT DOCUMENTS

| JP | 2010-259315 A | 11/2010 |
| JP | 2013-055725 A | 3/2013 |
| JP | 2015-053760 A | 3/2015 |

OTHER PUBLICATIONS

International Search Report for PCT/JP2016/083534 dated, Jan. 10, 2017 (PCT/ISA/210) English translation.

*Primary Examiner* — Alex W Mok
(74) *Attorney, Agent, or Firm* — Sughrue Mion, PLLC; Richard C. Turner

(57) ABSTRACT

A rotary electric machine stator according to the present invention includes: a frame that includes: a tube portion; and a flange portion that is disposed so as to be integrated with the tube portion so as to protrude radially outward from a first axial end of the tube portion; a stator core that is configured into an annular shape, and that is fitted together with and held inside the tube portion; coils that are mounted to the stator core; and a plurality of positioning members that are mounted to the flange portion so as to be movable radially and circumferentially around an axial center of the stator core.

16 Claims, 2 Drawing Sheets

(51) Int. Cl.
    *H02K 3/52*    (2006.01)
    *H02K 11/21*   (2016.01)
    *H02K 24/00*   (2006.01)
    *F16M 1/04*    (2006.01)
    *H02K 15/02*   (2006.01)
    *H02K 5/04*    (2006.01)

(52) U.S. Cl.
    CPC ............... *H02K 5/04* (2013.01); *H02K 11/21* (2016.01); *H02K 15/02* (2013.01); *H02K 24/00* (2013.01); *H02K 2203/03* (2013.01)

(58) Field of Classification Search
    USPC ....................................................... 310/68 B
    See application file for complete search history.

(56) References Cited

U.S. PATENT DOCUMENTS

| | | | |
|---|---|---|---|
| 2013/0221781 A1* | 8/2013 | Nakayama | H02K 5/04 310/89 |
| 2014/0197705 A1* | 7/2014 | Sato | H02K 5/04 310/91 |
| 2015/0022052 A1* | 1/2015 | Nobata | H02K 1/185 310/216.135 |
| 2015/0084478 A1 | 3/2015 | Yamashita et al. | |
| 2015/0162798 A1* | 6/2015 | Ozawa | H02K 5/161 310/43 |
| 2015/0229178 A1* | 8/2015 | Murakami | H02K 3/38 310/71 |
| 2015/0244235 A1* | 8/2015 | Fujimoto | F16M 1/04 310/62 |

* cited by examiner

ROTARY ELECTRIC MACHINE STATOR AND MANUFACTURING METHOD THEREFOR

CROSS REFERENCE TO RELATED APPLICATIONS

This application is a National Stage of International Application No. PCT/JP2016/083534 filed Nov. 11, 2016.

TECHNICAL FIELD

The present invention relates to a rotary electric machine stator for an electric motor, or a generator, etc., and to a manufacturing method therefor.

BACKGROUND ART

Conventional rotary electric machine stators have included: a plurality of split cores; an outer cylinder ring that fixes an outer circumferential side of the plurality of split cores so as to be arranged into an annular shape; and winding coils that are wound onto each of the split cores, the outer cylinder ring including a thin cylindrical tube portion; and fastening flanges that are respectively disposed so as flare outward from the tube portion, and that fix the stator by being fastened to an external housing or other devices (see Patent Literature 1, for example).

CITATION LIST

Patent Literature

Patent Literature 1: Japanese Patent Laid-Open No. 2013-55725 (Gazette)

SUMMARY OF THE INVENTION

Problem to be Solved by the Invention

In rotary electric machines of this kind, because a rotor is disposed on an inner circumferential side of the stator so as to ensure an extremely small gap away from the stator, it has been necessary to increase coaxiality of the stator and the rotor.

In conventional stators for rotary electric machines, because the split cores that are arranged into an annular shape are press-fitted into and fixed to the tube portion of the outer cylindrical ring, strain arises in the outer cylindrical ring. If parts such as an engine water jacket are fixed to the tube portion by welding, etc., strain due thereto also accumulates in the outer cylindrical ring. The fastening flanges are produced so as to be integrated with the tube portion, and constitute a portion of the outer cylindrical ring in which strain is accumulated. The outer cylindrical ring thereby deforms, making the positional relationship of the fastening portions of the fastening flanges relative to the axial center of the split cores that are arranged into the annular shape that is held by the outer cylindrical ring deteriorate. Thus, if the stator is mounted by fastening the fastening flanges to an external housing, the stator cannot be mounted to the external housing precisely. In other words, the central position of the stator cannot be positioned precisely at a set position. Coaxiality of the rotor and the stator thereby deteriorates in rotary electric machines that are produced by installing a rotor in an external housing.

The present invention aims to solve the above problems and an object of the present invention is to provide a stator for a rotary electric machine and a manufacturing method therefor in which a positioning member can be mounted to a frame so as to ensure high precision in a positional relationship of a positioning member relative to a stator core that is fitted together with and held by the frame, irrespective of deformation in the frame.

Means for Solving the Problem

A rotary electric machine stator according to the present invention includes: a frame that includes: a tube portion; and a flange portion that is disposed so as to be integrated with the tube portion so as to protrude radially outward from a first axial end of the tube portion; a stator core that is configured into an annular shape, and that is fitted together with and held inside the tube portion; coils that are mounted to the stator core; and a plurality of positioning members that are mounted to the flange portion so as to be movable radially and circumferentially around an axial center of the stator core.

Effects of the Invention

According to the present invention, positioning members are mounted to a flange portion so as to be movable radially and circumferentially around an axial center of a stator core. Thus, the positioning members can be moved and positioned at set positions in a circumferential direction and a radial direction around the axial center of the stator core after the stator core has been fitted together with and held inside a frame. Positional relationships between the stator core that has been fitted together with and held by the frame and the positioning members can thereby be ensured with high precision irrespective of deformation in the frame. Thus, if the stator that is configured in this manner is used, a rotary electric machine can be configured in which coaxiality between the rotor and the stator is increased.

DESCRIPTION OF EMBODIMENTS

Embodiment 1

Figure 1:
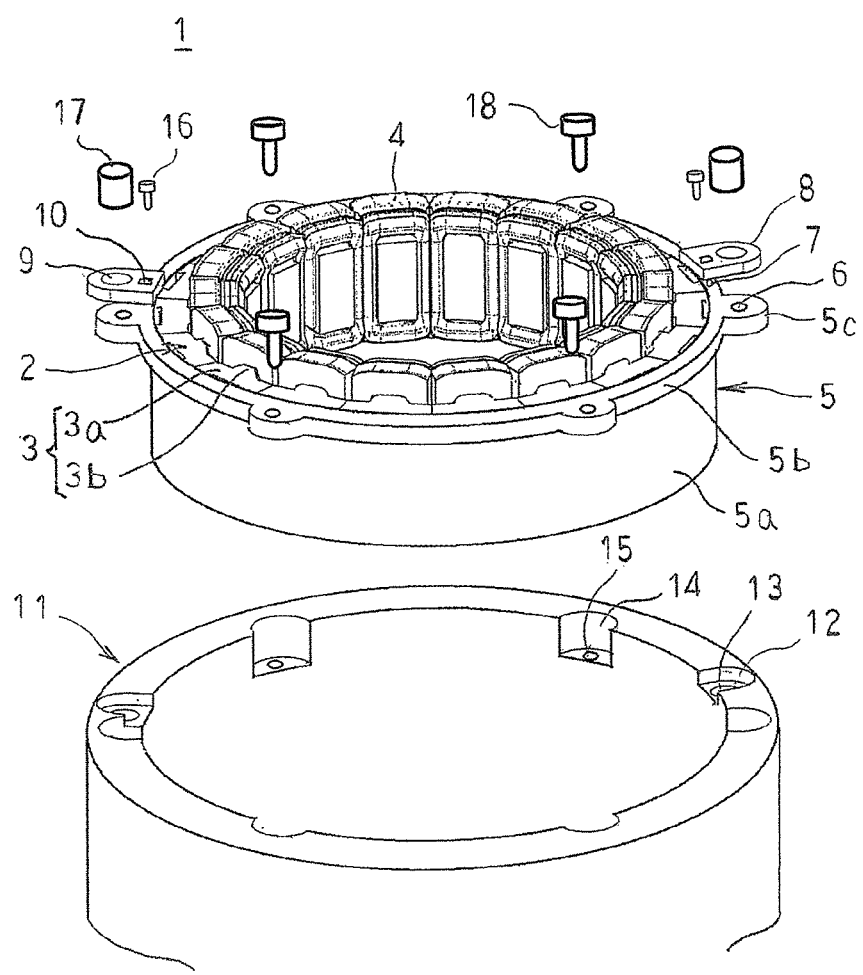
FIG. 1 is an oblique projection that explains a configuration of a rotary electric machine stator according to Embodiment 1 of the present invention.

FIG. 1 is an oblique projection that explains a configuration of a rotary electric machine stator according to Embodiment 1 of the present invention.

In FIG. 1, a rotary electric machine stator 1 includes: a stator core 2 that is configured by arranging core segments 3 into an annular shape, the core segments 3 including: a circular arc-shaped core back 3a; and a tooth 3b that protrudes radially inward from an inner circumferential surface of the core back 3a; coils 4 that are wound onto the respective teeth 3b of the core segments 3; and a cylindrical frame 5 that fits together with and holds the stator core 2 that has been configured by arranging the core segments 3 into an annular shape in an internal portion by press-fitting.

The frame 5 includes: a cylindrical tube portion 5a; a flange portion 5b that is formed around an entire circumference so as to protrude radially outward from a first axial end of the tube portion 5a; and a plurality of fastening flange portions 5c that are disposed so as to be distributed circumferentially so as to each protrude radially outward from the flange portion 5b. A fastening aperture 6 that functions as a fastening portion is formed on each of the fastening flange portions 5c. In addition, mounting screw-threaded apertures 7 are formed on two positions of the flange portion 5b that face each other from opposite sides of the axial center of the tube portion 5a. Moreover, the tube portion 5a, the flange portion 5b, and the fastening flange portions 5c are formed integrally using a metal such as iron, for example.

Positioning members 8 are produced using a thin steel plate, for example, and circular positioning apertures 9, and mounting apertures 10 that have larger diameters than shaft portions of positioning screws 16, are formed thereon.

A housing 11 is produced so as to have a cylindrical shape using a metal such as aluminum. A pair of positioning portions 12 are formed on a first end surface of the housing 11 so as to face each other from opposite sides of the axial center of the housing 11. A second positioning aperture 13 is formed on each of the positioning portions 12. Mounting portions 14 are formed on the first end surface of the housing 11 so as to correspond to each of the fastening flange portions 5c. A mounting screw-threaded aperture 15 is formed on each of the mounting portions 14

To assemble the stator 1 that is configured in this manner, eighteen core segments 3, onto each of which a coil 4 is wound, are first arranged into an annular shape such that circumferential side surfaces of the core backs 3a are butted against each other. Next, the group of core segments 3 that are arranged into the annular shape are press-fitted into the tube portion 5a of the frame 5. The stator core 2 that is formed into an annular shape using the core segments 3 is thereby fitted together with and held by the tube portion 5a. Next, the positioning screws 16 are passed through the mounting apertures 10, and are screwed into the mounting screw-threaded apertures 7, to mount the positioning members 8 to the flange portion 5b. Here, because the mounting apertures 10 are formed so as to have larger diameters than the shaft portions of the positioning screws 16, the positioning members 8 are movable circumferentially and radially around the axial center of the stator core 2. Then, the positioning members 8 are moved around the axial center of the stator core 2 such that aperture centers of the positioning apertures 9 are positioned at set circumferential positions and radial positions. Next, the positioning members 8 that have been positioned in this manner are fixed to the frame 5 by fastening the positioning screws 16, to assemble the stator 1.

Now, the mounting screw-threaded apertures 7 are formed on the flange portion 5b such that the stator core 2 and the housing are coaxial when the frame 5 is mounted to the housing 11. In other words, the circumferential positions and the radial positions of the centers of the positioning apertures 9 of the two positioning members 8 that are mounted to the flange portion 5b, which are centered around the axial center of the tube portion 5a in a state in which the stator core 2 has not been press-fitted therein, are aligned with the circumferential positions and the radial positions of the centers of the two positioning apertures 13 that are formed on the housing 11, which are centered around the axial center of the housing 11.

However, strain arises in the frame 5 due to press-fitting the stator core 2 into the tube portion 5a, deforming the frame 5. Center positions of the two positioning apertures 9 are displaced relative to center positions of the two positioning apertures 13 that are formed on the housing 11 by this deformation of the frame 5. In Embodiment 1, the above-mentioned misalignment that results from the deformation of the frame 5 is compensated for by the positioning members 8 being moved around the axial center of the stator core 2 that is fitted together with and held by the frame 5 such that aperture centers of the positioning apertures 9 are positioned at the set circumferential positions and radial positions.

In a stator 1 that is assembled in this manner, the positioning members 8 are mounted to the housing 11 by placing the positioning apertures 9 and 13 on top of one another, and press-fitting positioning pins 17 into the positioning apertures 9 and 13. The stator 1 is thereby housed inside the housing 11 in a state of being positioned with high precision, making the stator core 2 and the housing 11 coaxial. Next, the mounting screws 18 are passed through the fastening apertures 6, and are fastened to the screw-threaded apertures 15, to fix the fastening flange portions 5c to the housing 11. The stator 1 is thereby held firmly by the housing 11 in a state of being positioned with high precision.

According to Embodiment 1, the positioning members 8 are fixed so as to be movable in a radial direction and a circumferential direction by being fastened to the flange portions 5b of the frame 5 into which the stator core 2 is fitted together and held by press-fitting. Thus, even if strain arises in the frame 5 due to the press-fitting of the stator core 2, and the frame 5 deforms, the aperture centers of the positioning apertures 9 of the positioning members 8 can be positioned in set circumferential positions and radial positions that are centered around the axial center of the stator core 2 by loosening fastening of the positioning members 8. In this manner, the positioning members 8 can be positioned relative to the stator core 2 with high precision irrespective of deformation of the frame 5.

The stator 1 that is configured in this manner is mounted to the housing 11 by press-fitting the positioning pins 17 into the positioning apertures 9 and 13 of the positioning members 8 and the housing 11. In addition, the stator 1 is housed and held inside the housing 11 coaxially by fastening mounting screws 18 that are passed through the fastening apertures 6 of the fastening flange portions 5c into the screw-threaded apertures 15 of the housing 11. In other words, the stator 1 is housed and held inside the housing 11 in a state of being positioned with high precision. Thus, coaxiality between the rotor and the stator 1 is ensured in a rotary electric machine that uses the stator 1, suppressing the generation of noise during driving, and also enabling extension of service life to be achieved.

The positioning members 8 have no function in fixing the stator 1 to the housing 11, and only have a positioning function. Thus, because the rigidity of the positioning members 8 can be reduced compared to positions on the flange portion 5b of the frame 5 that correspond to the mounting positions of the positioning members 8, thin steel sheets can be used, enabling the positioning members 8 to be produced inexpensively.

Because the flange portion 5b is formed so as to protrude radially outward from the first axial end of the tube portion 5a around the entire circumference, the rigidity of the frame 5 can be increased.

Moreover, in Embodiment 1 above, a flange portion is formed so as to protrude radially outward from a first axial end of a tube portion around an entire circumference, but a flange portion need only be formed at mounting positions of positioning members and positions of formation of fastening flange portions.

Embodiment 2

Figure 2:
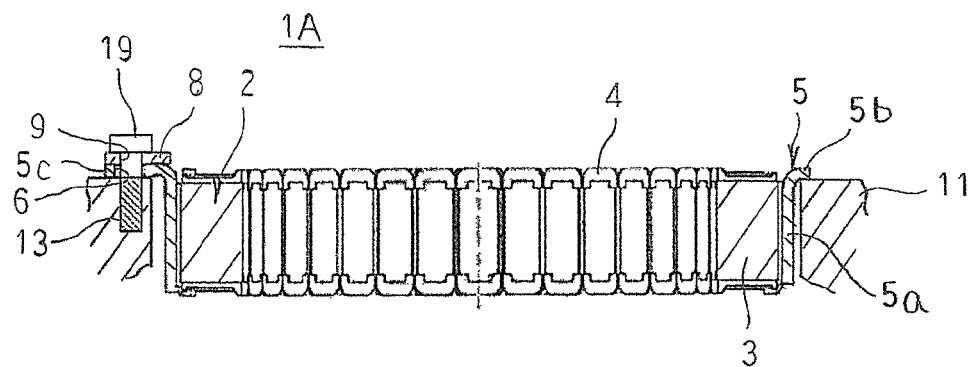
FIG. 2 is a cross section that shows a rotary electric machine stator according to Embodiment 2 of the present invention.

FIG. 2 is a cross section that shows a rotary electric machine stator according to Embodiment 2 of the present invention.

In FIG. 2, a fastening aperture 6 that is formed on a fastening flange portion 5c is formed so as to have a larger diameter than a first positioning aperture 9 that is formed on a positioning member 8. The positioning member 8 is stacked on the fastening flange portion 5c, and is fixed by being fastened to a flange portion 5b of a frame 5 by a positioning screw 16. Here, the first positioning aperture 9 is positioned inside the fastening aperture 6 when viewed from an axial direction of a stator core 2.

Moreover, a remainder of the configuration is configured in a similar or identical manner to that of Embodiment 1 above.

In a stator 1A that is configured in this manner, because the positioning member 8 is fixed by being fastened to the flange portion 5b of the frame 5 so as to be movable radially and circumferentially, the positioning members 8 can be positioned relative to the stator core 2 with high precision irrespective of deformation of the frame 5.

The stator 1A is mounted to the housing 11 by press-fitting a bolt 19 that has high dimensional precision into the positioning apertures 9 and 13, instead of a positioning pin 17. Here, because the fastening aperture 6 is formed so as to have a larger diameter than the first positioning aperture 9, and the first positioning aperture 9 is positioned inside the fastening aperture 6 when viewed from an axial direction of a stator core 2, the bolt 19 can be passed through the first positioning aperture 9 and the fastening aperture 6 and be press-fitted into the second positioning aperture 13.

Consequently, similar or identical effects to those in Embodiment 1 above can also be achieved in Embodiment 2.

According to Embodiment 2, because positioning by the positioning member 8 and fixing by the fastening flange portion 5c are performed at an identical position, space saving can be achieved. Because the positioning and the fixing relative to the housing 11 of the stator 1A can be performed by the single bolt 19, the number of parts can be reduced.

Embodiment 3

Figure 3:
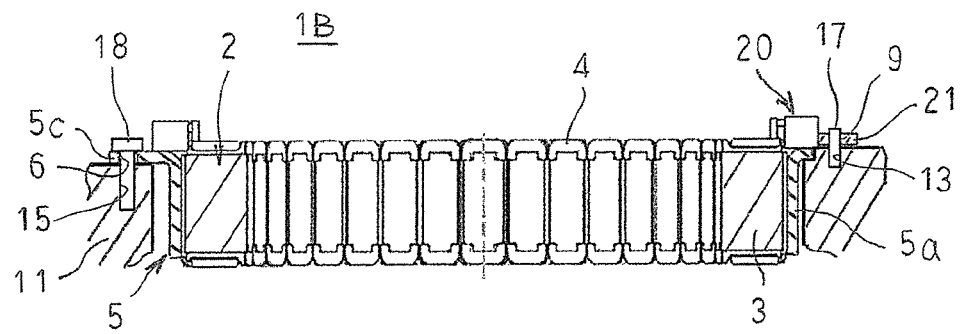
FIG. 3 is a cross section that shows a rotary electric machine stator according to Embodiment 3 of the present invention.

FIG. 3 is a cross section that shows a rotary electric machine stator according to Embodiment 3 of the present invention.

In FIG. 3, a connection board unit 20 is disposed at a first axial end of a stator core 2, and connects coils 4 to configure a desired alternating-current winding. Two brackets 21 protrude radially outward from different positions in a circumferential direction of the connection board unit 20. Mounting apertures that have larger diameters than shaft portions of positioning screws 16 (not shown) are formed on the brackets 21. Positioning apertures 9 are formed further outward on the brackets 21 than the mounting apertures.

Moreover, a remainder of the configuration is configured in a similar or identical manner to that of Embodiment 1 above.

In Embodiment 3, the connection board unit 20 is mounted to the first axial end of the stator core 2 that is fitted together with and held by the tube portion 5a of the frame 5 by press-fitting. Although not shown, the positioning screws 16 are passed through the mounting apertures of the brackets 21 and fastened into the mounting screw-threaded apertures 7 that are formed on the flange portion 5b. The aperture centers of the positioning apertures 9 of the brackets 21 are positioned in set circumferential positions and radial positions that are centered around the axial center of the stator core 2 by loosening fastening of the positioning screws 16, moving the connection board unit 20, and bending the brackets 21. Next, the connection board unit 20 is fixed to the frame 5 by fastening the positioning screws 16. The brackets 21 are thereby positioned relative to the stator core 2 with high precision. Next, the desired alternating-current winding is configured by connecting the coils 4 using the connection board unit 20, to assemble a stator 1B.

In the stator 1B that is assembled in this manner, the brackets 21 are fixed to the housing 11 by placing the positioning apertures 9 and 13 on top of one another, and press-fitting positioning pins 17 into the positioning apertures 9 and 13. The stator 1B is thereby housed inside the housing 11, making the stator core 2 and the housing 11 coaxial. Next, the mounting screws 18 are passed through the fastening apertures 6, and are fastened to the screw-threaded apertures 15, to fix the fastening flange portions 5c to the housing 11. The stator 1B is thereby held firmly by the housing 11 in a state of being positioned with high precision.

In Embodiment 3, the brackets 21 can also be positioned relative to the stator core 2 with high precision irrespective of deformation of the frame 5. Consequently, similar or identical effects to those in Embodiment 1 above can also be achieved in Embodiment 3.

According to Embodiment 3, because the brackets 21 for fixing the connection board unit 20 to the frame 5 also function as positioning members, the number of parts can be reduced.

Moreover, in Embodiment 3, positioning by the brackets 21 that also function as positioning members and fixing by the fastening flange portions 5c may be performed at identical positions in a similar or identical manner to Embodiment 2 above.

Embodiment 4

Figure 4:
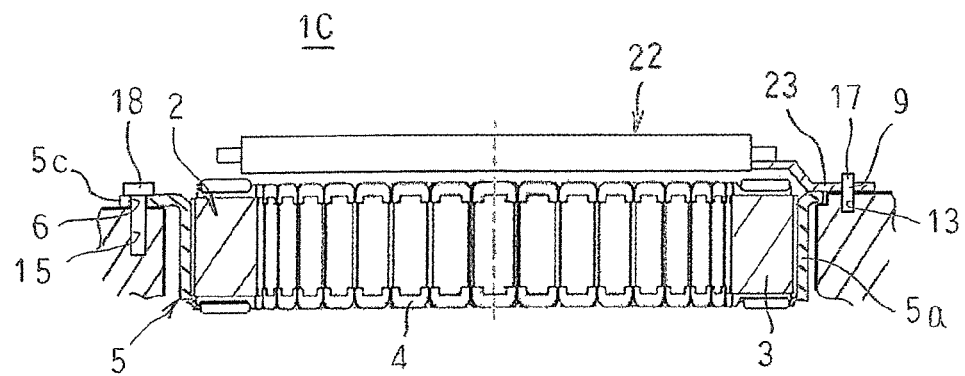
FIG. 4 is a cross section that shows a rotary electric machine stator according to Embodiment 4 of the present invention.

FIG. 4 is a cross section that shows a rotary electric machine stator according to Embodiment 4 of the present invention.

In FIG. 4, a resolver 22 detects rotational frequency of a rotor and is disposed at a first axial end of the stator core 2. Two brackets 23 protrude radially outward from different positions in a circumferential direction of the resolver 22. Mounting apertures that have larger diameters than shaft portions of positioning screws 16 (not shown) are formed on the brackets 23. Positioning apertures 9 are formed further outward on the brackets 23 than the mounting apertures.

Moreover, a remainder of the configuration is configured in a similar or identical manner to that of Embodiment 1 above.

In Embodiment 4, the resolver 22 is mounted to the first axial end of the stator core 2 that is fitted together with and held by the tube portion 5a of the frame 5 by press-fitting. Although not shown, the positioning screws 16 are passed through the mounting apertures of the brackets 23 and fastened into the mounting screw-threaded apertures 7 that are formed on the flange portion 5b. The aperture centers of the positioning apertures 9 of the brackets 23 are positioned in set circumferential positions and radial positions that are centered around the axial center of the stator core 2 by loosening fastening of the positioning screws 16, moving the resolver 22, and bending the brackets 23. Next, the resolver 22 is fixed to the frame 5 by fastening the positioning screws 16, to assemble a stator 1C.

In the stator 1C that is assembled in this manner, the brackets 23 are fixed to the housing 11 by placing the positioning apertures 9 and 13 on top of one another, and press-fitting positioning pins 17 into the positioning apertures 9 and 13. The stator 1C is thereby housed inside the housing 11, making the stator core 2 and the housing 11 coaxial. Next, the mounting screws 18 are passed through the fastening apertures 6, and are fastened to the screw-threaded apertures 15, to fix the fastening flange portions 5c to the housing 11. The stator 1C is thereby held firmly by the housing 11 in a state of being positioned with high precision.

In Embodiment 4, the brackets 23 can also be positioned relative to the stator core 2 with high precision irrespective of deformation of the frame 5. Consequently, similar or identical effects to those in Embodiment 1 above can also be achieved in Embodiment 4.

According to Embodiment 4, because the brackets 23 for fixing the resolver 22 to the frame 5 also function as positioning members, the number of parts can be reduced.

Moreover, in Embodiment 4, positioning by the brackets 23 that also function as positioning members and fixing by the fastening flange portions 5c may be performed at identical positions in a similar or identical manner to Embodiment 2 above.

Moreover, in each of the above embodiments, positioning members that have reduced rigidity have been used, but positioning members that have greater rigidity due to increased thickness may be used. In that case, a function of fixing the stator to the housing may also be imparted, in addition to the positioning function, by forming fastening apertures on the positioning members, or by making the fastening apertures also function as positioning apertures. The fastening flange portion can thereby be omitted, enabling simplification of the configuration of the frame to be achieved.

In each of the above embodiments, two positioning members have been disposed on a frame that face each other from opposite sides of an axial center of a stator core, but the two positioning members need only be disposed on the frame so as to be separated in a circumferential direction. Furthermore, the number of positioning members may alternatively be three or more. In that case, the positioning members should be disposed so as to be distributed circumferentially, and it is particularly preferable for the positioning members to be arranged at a uniform angular pitch.

In each of the above embodiments, coils are constituted by concentrated winding coils that are wound onto core segments, but the coils may alternatively be distributed winding coils such as lap winding coils, wave-wound coils, etc.

In each of the above embodiments, a stator core is constituted by eighteen core segments, but the number of the core segments is not limited to eighteen.

In each of the above embodiments, a stator core is constituted by arranging core segments into an annular shape, but the stator core may be constituted by an annular integrated body.

In each of the above embodiments, core segments that are arranged into an annular shape are fitted together with and held by a tube portion of a frame by press-fitting, but the core segments that are arranged into the annular shape may be fitted together with and held by the tube portion of the frame by shrinkage-fitting.

EXPLANATION OF NUMBERING

2 STATOR CORE; 4 COIL; 5 FRAME; 5a TUBE PORTION; 5b FLANGE PORTION; 5c FASTENING FLANGE PORTION; 6 FASTENING APERTURE (FASTENING PORTION); 8 POSITIONING MEMBER; 20 CONNECTING UNIT; 21 BRACKET; 22 RESOLVER; 23 BRACKET.

The invention claimed is:

1. A rotary electric machine stator to be housed inside a housing, the rotary electric machine stator comprising:
a frame that comprises:
a tube portion; and
a flange portion that is disposed so as to be integrated with said tube portion so as to protrude radially outward from a first axial end of said tube portion;
a stator core that is configured into an annular shape, and that is fitted together with and held inside said tube portion;
coils that are mounted to said stator core; and
a plurality of positioning members provided axially adjacent to the flange portion, said plurality of positioning members respectively comprising a mounting aperture and a first positioning aperture separate from the mounting aperture,
a plurality of second positioning apertures, each second positioning aperture of the plurality of second positioning apertures being on a first axial end of the housing,
wherein each of said plurality of positioning members are mounted axially adjacent to said flange portion by a screw fitted through said mounting aperture so as to be movable radially and circumferentially around an axial center of said stator core to align said first positioning aperture to said second positioning aperture of the housing and position said rotary electric machine stator relative to said housing.

2. The rotary electric machine stator according to claim 1, wherein said positioning members are fixed by being fastened to said flange portion.

3. The rotary electric machine stator according to claim 2, wherein rigidity of said positioning members is less than rigidity of said flange portion.

4. The rotary electric machine stator according to claim 2, further comprising a connection board unit that is disposed at a first axial end of said stator core, and that connects said coils,
a bracket for fixing said connection board unit to said frame also serving as said positioning members.

5. The rotary electric machine stator according to claim 2, further comprising a resolver that is disposed at a first axial end of said stator core,
a bracket for fixing said resolver to said frame also serving as said positioning members.

6. The rotary electric machine stator according to claim 2, wherein said frame comprises a plurality of fastening flange portions that comprise fastening portions, said fastening flange portions being disposed so as to be integrated with said flange portion so as to protrude radially from said flange portion.

7. The rotary electric machine stator according to claim 6, wherein said positioning members are mounted to said flange portion so as to overlap axially with said fastening flange portions.

8. The rotary electric machine stator according to claim 2, wherein said positioning members have a fastening portion.

9. The rotary electric machine stator according to claim 1, wherein rigidity of said positioning members is less than rigidity of said flange portion.

10. The rotary electric machine stator according to claim 1, further comprising a connection board unit that is disposed at a first axial end of said stator core, and that connects said coils,
a bracket for fixing said connection board unit to said frame also serving as said positioning members.

11. The rotary electric machine stator according to claim 1, further comprising a resolver that is disposed at a first axial end of said stator core,
a bracket for fixing said resolver to said frame also serving as said positioning members.

12. The rotary electric machine stator according to claim 1, wherein said frame comprises a plurality of fastening flange portions that comprise fastening portions, said fastening flange portions being disposed so as to be integrated with said flange portion so as to protrude radially from said flange portion.

13. The rotary electric machine stator according to claim 12, wherein said positioning members are mounted to said flange portion so as to overlap axially with said fastening flange portions.

14. The rotary electric machine stator according to claim 1, wherein said positioning members have a fastening portion.

15. The rotary electric machine stator according to claim 1,
wherein each of said plurality of positioning members being mounted axially adjacent to said flange portion is to be mounted to said housing by a positioning pin fitted through said first positioning aperture of each of said plurality of positioning members and said second positioning aperture of said housing, and
wherein said mounting aperture has larger diameter than a shaft portion of said screw.

16. A manufacturing method for a rotary electric machine stator comprising:
a frame that comprises:
a tube portion; and
a flange portion that is disposed so as to be integrated with said tube portion so as to protrude radially outward from a first axial end of said tube portion;
a stator core that is configured into an annular shape, and that is fitted together with and held inside said tube portion;
coils that are mounted to said stator core; and
a plurality of positioning members that are mounted axially adjacent to said flange portion by a screw fitted through a mounting aperture of the plurality of positioning members so as to be movable radially and circumferentially around an axial center of said stator core to be mounted to a housing by a positioning pin through a first positioning aperture of the plurality of positioning members that is separate from the mounting aperture such that the first positioning aperture is aligned with a second positioning aperture of the housing,
wherein:
said plurality of positioning members are mounted to said flange portion after said stator core to which said coils have been mounted and that has been configured into said annular shape has been fitted together with and held inside said tube portion.

\* \* \* \* \*